June 7, 1927.
M. BRITT
1,631,463
PROCESS OF SMOKING MEAT
Filed May 5, 1926
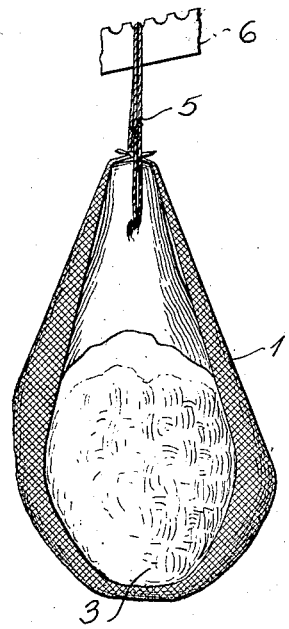
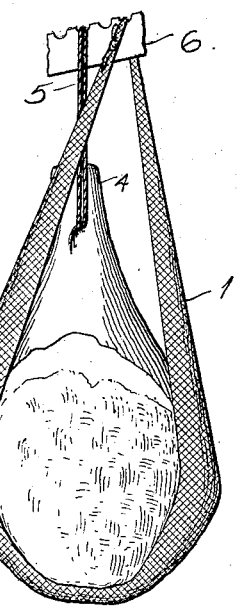
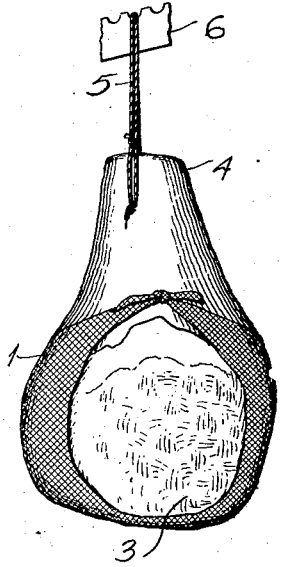
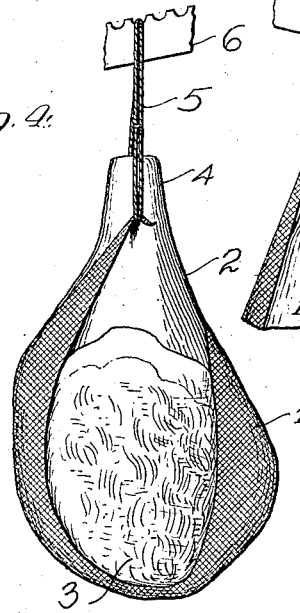
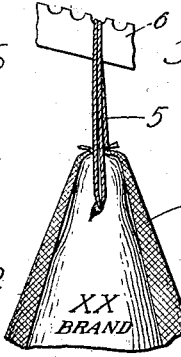
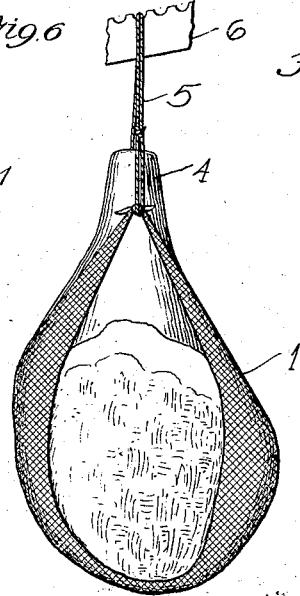
Witness
Martin H. Olsen.
Inventor
Max Britt,
By Rummler & Rummler,
Attys.

Patented June 7, 1927.

1,631,463

UNITED STATES PATENT OFFICE.

MAX BRITT, OF CHICAGO, ILLINOIS, ASSIGNOR TO SWIFT & COMPANY, OF CHICAGO, ILLINOIS, A CORPORATION OF ILLINOIS.

PROCESS OF SMOKING MEAT.

Application filed May 5, 1926. Serial No. 106,854.

The present invention relates to a process for smoking meat and more particularly to a process for smoking joint meat such as hams and the like.

The ordinary process of smoking joint meats such as hams and the like, by subjecting them to the influence of heat and smoke, causes the butt portion, which contains seams, to open, and the smoke entering therein blackens or darkens the meat adjacent these seams, and also causes the lean exposed surface to become hard and dried.

The blackened, darkened, and hard portions present an unsightly appearance and have a reduced value, and it is sometimes necessary to cut away and discard a portion thereof.

Moreover, when the meat is subjected to this smoking, it changes its shape because the butt portion drops or sags which also gives it a poor appearance and reduces the value as it is sometimes necessary to trim away the sagged portion.

Further, in the ordinary smoking process there is often times a rendering out of fat on the butt ends, which, when hams are cooling after smoking, causes chilled beads of grease to form which are undesirable and, even when wiped off, give the meat a moist and somewhat smeary appearance.

To overcome these difficulties, some of the packers have enclosed the meat in porous elastic stockings during the smoking process. The bags or stockings will prevent cracking and sagging of the meat, but other attending disadvantages result because the meat to be smoked is entirely surrounded by the cloth.

These disadvantages are overcome by the use of the present invention.

This invention necessitates only the partial enclosing of the meat to be smoked such as by means of a sling or band of non-elastic material embracing the edges of the meat.

In using the present invention, the sling is pulled taut and fastened so as to exert a gentle pressure on the butt, which, as the smoking process proceeds, serves to hold the lower surface of the butt smooth or flattened to gently round up the corners and edges and hold the juices against the surface adjacent to the sling, with the result that when the sling is removed, the hams, etc., present a smooth appearance which enables the dealer to make a full slice of fairly uniform thickness without wasteful trimming.

The smoke and heat come in more direct contact with a large portion of the meat so as to be more effective in smoking and preserving and give it a richer color than if it is entirely enclosed in a bag or stocking. To obtain the desired result of a rich smoked color with meat enclosed within a bag, or the like, it is necessary to subject the meat to the smoke and heat for a considerably longer period at an additional cost.

It is customary to brand the back of the hams with ink before smoking, and this may be done with the use of such sling without smearing the ink for the reason that the sling does not come in contact with the wet ink.

The primary purpose of smoking being for the purpose of preservation though partly for flavoring, this invention permits both, at the same time giving the butts and edges of the meat a desirable, smooth, rounded, shapely appearance, and the meats retain more of their natural juices.

The objects hereinbefore appearing may be attained by employing a sling arranged as illustrated, in the accompanying drawings, wherein—

Figure 1 shows a ham suspended from the trolley bar by means of a string hanger, and having a sling of flexible and porous material which is preferably non-elastic, such as cheese-cloth, wrapped around the butt with its ends tied together at the top of the ham.

Fig. 2 is a similar view wherein the sling extends around the trolley bar.

Fig. 3 is a view showing the ends of the sling tied around the shank of the ham.

Fig. 4 shows the ends of the sling held between the string hanger and the shank and located on respectively opposite sides.

Fig. 5 is a view similar to that shown in Fig. 4 but showing the ends of the sling arranged on the same side of the ham.

Fig. 6 is a back view of part of the ham shown in Fig. 1, in which a brand is indicated by XX.

As herein illustrated, the invention involves the use of a sling 1 which is wrapped around the edges of the meat. In the forms shown, the sling is applied to hams 2 comprising the usual butt 3 and shank 4. Extending through the shank 4, is the usual string hanger 5 whereby the meat is suspended from a rack or trolley bar 6.

The improved sling 1 is preferably made of cheese-cloth, but may be made of any suitable material which is porous and flexible, and preferably non-elastic. The sling is preferably in the form of a narrow strip or band of sufficient width to cover the edges of the butt 3.

In the operation of curing a ham or other meat, it is first cured, and is then soaked and washed in water to cleanse the meat and to remove some of the surface salt. The back side of the ham is then branded with ink and the ham is hung on the trolley bar by means of the string hanger 5. The improved sling is then wrapped around the butt and its ends secured in any of the various ways illustrated in the accompanying drawing. The meat is then placed in the smoking room where it remains for the required length of time. The sling may be removed as soon as the meat is taken out of the smoking room or it may be left on the ham to be removed by the consumer. The sling is preferably non-elastic so as not to stretch when the butt end tends to drop. The non-elastic sling holds the meat in proper place and gives the desired contour to the butt.

Although only some embodiments of this invention have been herein shown and described, it will be understood that some of the details may be altered or omitted without departing from the spirit of this invention.

I claim:

The process of curing meat which consists in wrapping an individual sling around each piece of the same to cover the edges thereof and leaving the major portions of its surface exposed, suspending the sling from a hanger so that the weight of the meat causes pressure of the sling against the butt and side edges of the meat and then subjecting the same to the action of heat and smoke.

Signed at Chicago this 1st day of May, 1926.

MAX BRITT.